US011462864B2

(12) United States Patent
Saito et al.

(10) Patent No.: US 11,462,864 B2
(45) Date of Patent: Oct. 4, 2022

(54) CHARGING CONNECTOR FOR USE WITH VEHICLE

(71) Applicant: YAZAKI CORPORATION, Tokyo (JP)

(72) Inventors: Akihiro Saito, Kakegawa (JP); Tsutomu Sawada, Kakegawa (JP); Yoshitaka Tsushima, Fujieda (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/167,104

(22) Filed: Feb. 4, 2021

(65) Prior Publication Data

US 2021/0242638 A1 Aug. 5, 2021

(30) Foreign Application Priority Data

Feb. 4, 2020 (JP) ............................. JP2020-017194

(51) Int. Cl.

| *H01R 13/66* | (2006.01) |
| *B60L 53/16* | (2019.01) |
| *H01R 13/52* | (2006.01) |
| *H01R 13/518* | (2006.01) |

(52) U.S. Cl.
CPC ..... *H01R 13/6683* (2013.01); *H01R 13/5208* (2013.01); *H01R 13/5213* (2013.01); *B60L 53/16* (2019.02); *H01R 13/518* (2013.01); *H01R 2201/26* (2013.01)

(58) Field of Classification Search
CPC ............ H01R 13/6683; H01R 13/5208; H01R 13/5213; H01R 13/7137; H01R 2201/26; B60L 53/16
See application file for complete search history.

(56) References Cited

U.S. PATENT DOCUMENTS

| 5,751,135 | A | 5/1998 | Fukushima et al. | |
| 9,496,637 | B2* | 11/2016 | Ichio | ................... H01R 13/5812 |
| 9,681,571 | B2* | 6/2017 | Hansen | ................. H05K 7/1432 |
| 10,063,008 | B2* | 8/2018 | Kawai | ..................... H01R 24/76 |
| 10,833,458 | B2* | 11/2020 | Sarraf | ........................ G01K 7/42 |
| 10,953,761 | B2* | 3/2021 | Arai | ...................... B60L 53/302 |
| 2016/0072213 | A1 | 3/2016 | Ichio et al. | |

(Continued)

FOREIGN PATENT DOCUMENTS

| DE | 10 2015 004 313 A1 | 10/2016 |
| DE | 10 2016 211 876 A1 | 1/2018 |

(Continued)

*Primary Examiner* — Vanessa Girardi
(74) *Attorney, Agent, or Firm* — Kenealy Vaidya LLP

(57) ABSTRACT

A connector includes a terminal fitting connected to an end of an electric wire, a housing including a terminal accommodating chamber configured to accommodate the terminal fitting, a temperature sensor connected to an end of a detection line and configured to be attached to the terminal fitting, and a heat retaining cover. The heat retaining cover is configured to be attached to the housing such that the heat retaining cover covers a rear end portion of the housing and to retain heat inside the terminal accommodating chamber, the heat retaining cover having an electric wire guiding out portion through which the electric wire and the detection line drawn out from the terminal accommodating chamber are to be inserted.

3 Claims, 5 Drawing Sheets

(56) References Cited

U.S. PATENT DOCUMENTS

| | | |
|---|---|---|
| 2016/0111831 A1 | 4/2016 | Kawai et al. |
| 2018/0048090 A1 | 2/2018 | Kawai et al. |
| 2019/0036278 A1 | 1/2019 | Shimizu et al. |
| 2019/0260146 A1 | 8/2019 | Feldner et al. |
| 2021/0063097 A1* | 3/2021 | Hitchcock ............... F28F 1/022 |

FOREIGN PATENT DOCUMENTS

| | | |
|---|---|---|
| EP | 2955796 A1 | 12/2015 |
| JP | H9-161898 A | 6/1997 |
| JP | 2002-352635 A | 12/2002 |
| JP | 2015-11797 A | 1/2015 |
| JP | 2018-26288 A | 2/2018 |
| JP | 2019-500733 A | 1/2019 |
| WO | 2014/147761 A1 | 9/2014 |

* cited by examiner

CHARGING CONNECTOR FOR USE WITH VEHICLE

CROSS-REFERENCE TO RELATED APPLICATION

The present application claims priority to Japanese Patent Application No. 2020-017194 filed on Feb. 4, 2020, the entire content of which is incorporated herein by reference.

TECHNICAL FIELD

The present invention relates to a connector.

BACKGROUND

Charging of a battery mounted on a vehicle such as an electric vehicle or a plug-in hybrid vehicle is performed by fitting a power supply connector, which is a counterpart connector, to a charging connector, which is attached to a vehicle body.

When a battery of the charging connector is charged, since a high current may flow, the temperature of the charging connector and an electric wire may become high. If the electric wire and the charging connector get too hot, an electrical resistance may increase, and the charging connector, the electric wire, or other components may be damaged.

Therefore, when the battery is charged, it is required to conduct highly reliable measurement of states occurring in the charging connector in order to shorten charging time when a high current flows and at the same time, to avoid problems that may occur during charging (such as an undesirably high temperature). Therefore, a thermistor (temperature sensor) is mounted to a terminal fitting attached to an end portion of the electric wire, and a temperature of the terminal fitting is detected (see JP2019-500733A and JP2002-352635A, for example).

However, although the related art thermistor mounted to the terminal fitting is attached such that the thermistor comes into contact with a heat generating portion due to energization, the thermistor may be displaced due to various factors such as a clearance between components, shrinkage caused by a temperature change, and the like. When the thermistor is displaced away from the heat generating portion, temperature detection sensitivity may be reduced and abnormal heat generation may not be detected appropriately.

SUMMARY

Illustrative aspects of the present invention provide a connector configured to accurately measure a temperature of a terminal fitting without reducing temperature detection sensitivity of a temperature sensor.

According to an illustrative aspect of the present invention, a connector includes a terminal fitting connected to an end of an electric wire, a housing including a terminal accommodating chamber configured to accommodate the terminal fitting, a temperature sensor connected to an end of a detection line and configured to be attached to the terminal fitting, and a heat retaining cover. The heat retaining cover is configured to be attached to the housing such that the heat retaining cover covers a rear end portion of the housing and to retain heat inside the terminal accommodating chamber, the heat retaining cover having an electric wire guiding out portion through which the electric wire and the detection line drawn out from the terminal accommodating chamber are to be inserted.

Other aspects and advantages of the invention will be apparent from the following description, the drawings and the claims.

BRIEF DESCRIPTION OF DRAWINGS

FIGS. 5A and 5B are schematic views showing an attachment state of a temperature sensor attached to a terminal fitting, in which FIG. 5A shows the temperature sensor at a predetermined position and FIG. 5B shows the temperature sensor which has been displaced from the predetermined position.

DESCRIPTION OF EMBODIMENTS

Figure 1:
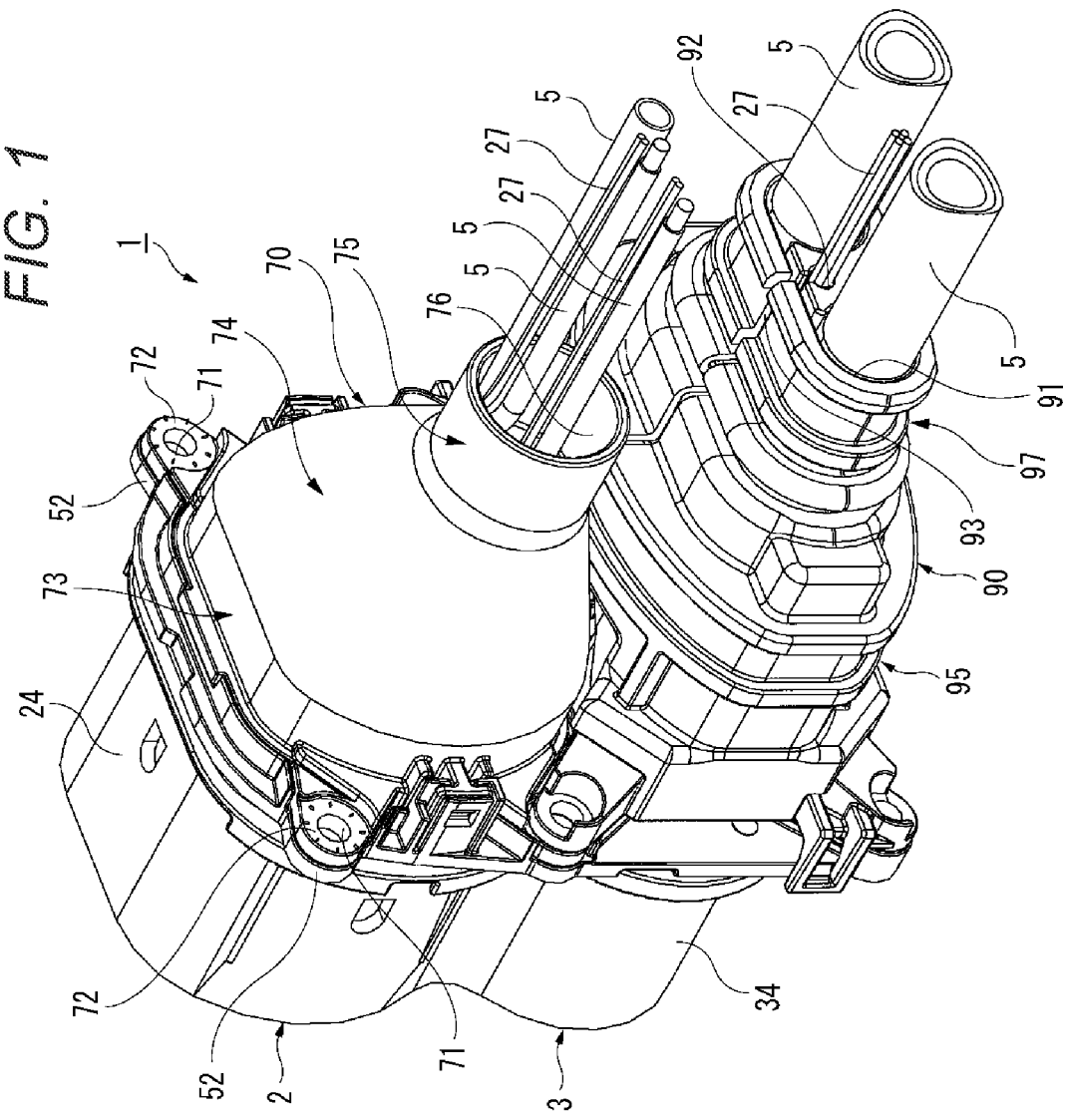
FIG. 1 is a perspective view showing a connector according to an embodiment as viewed from a rear side.
Figure 2:
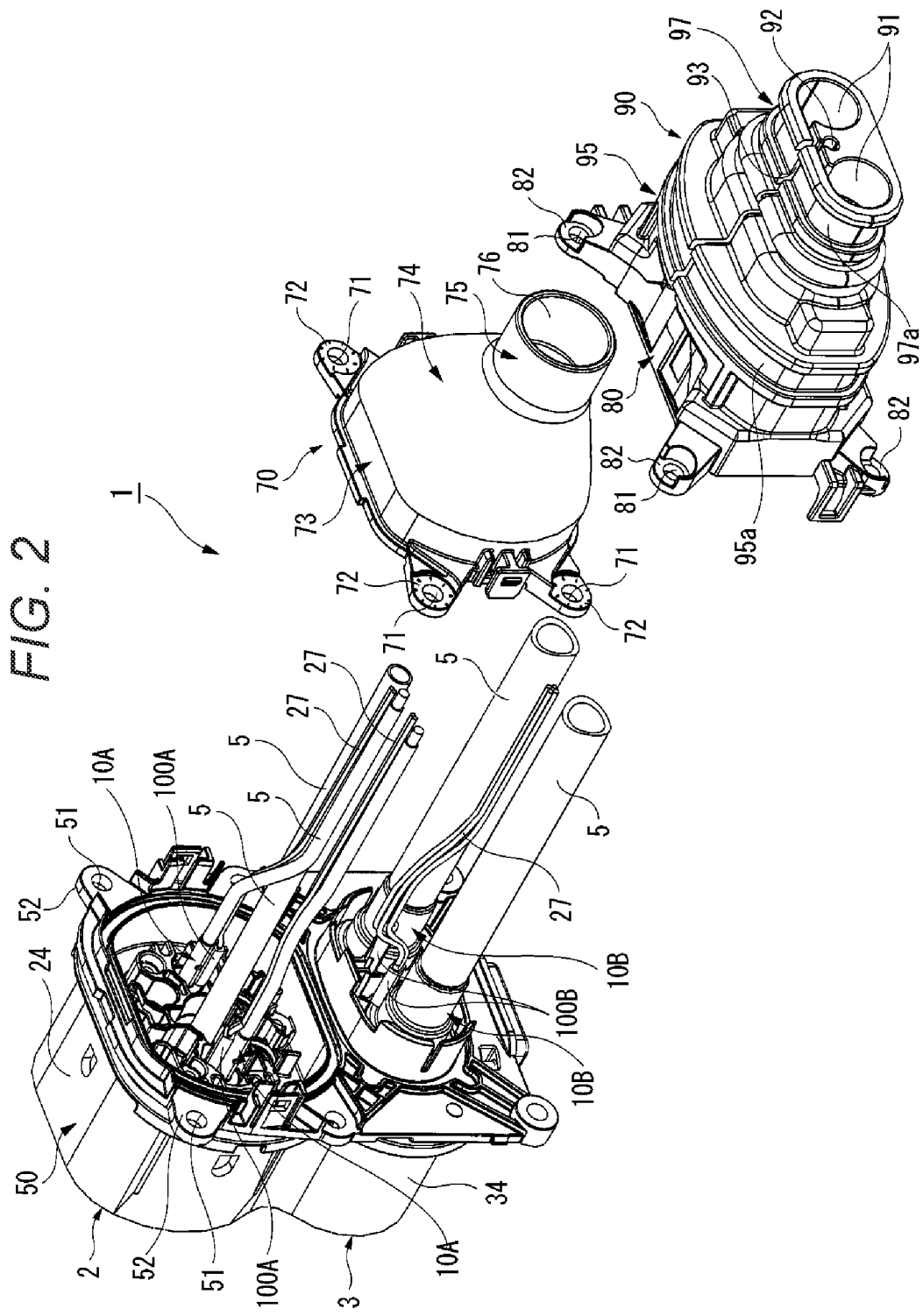
FIG. 2 is an exploded perspective view showing a main part of the connector shown in FIG. 1.

Hereinafter, exemplary embodiments of the present invention will be described in detail with reference to the drawings. FIG. 1 is a perspective view showing a connector 1 according to an embodiment as viewed from a rear side. FIG. 2 is an exploded perspective view showing a main part of the connector 1 shown in FIG. 1.

For example, the connector 1 according to the embodiment can be suitably used in a power-reception-side connector to be mounted on a vehicle, which serves as a charging connector. The connector may also be used as a power-supply-side connector mounted on a vehicle. Now referring to FIGS. 1 and 2, the connector 1 according to the embodiment is connected to end portions of a plurality of electric wires 5. Each of the electric wires 5 to which the connector 1 is connected may be a power line, a ground line, a signal line, or the like. A counterpart connector (not shown) is to be connected to a front portion of the connector 1.

The connector 1 according to the present embodiment includes a first connector portion 2 and a second connector portion 3. Terminals (terminal fittings) 10A are mounted to the first connector portion 2 from a rear side of the first connector portion 2 and terminals (terminal fittings) 10B are mounted to the second connector portion 3 from a rear side of the second connector portion 3. Each of the terminals 10A connected to the electric wire 5 provided as, for example, a signal line is inserted and mounted to the first connector portion 2, and each of the terminals 10B connected to the electric wire 5 provided as, for example, a power line is inserted and mounted to the second connector portion 3.

Figure 3:
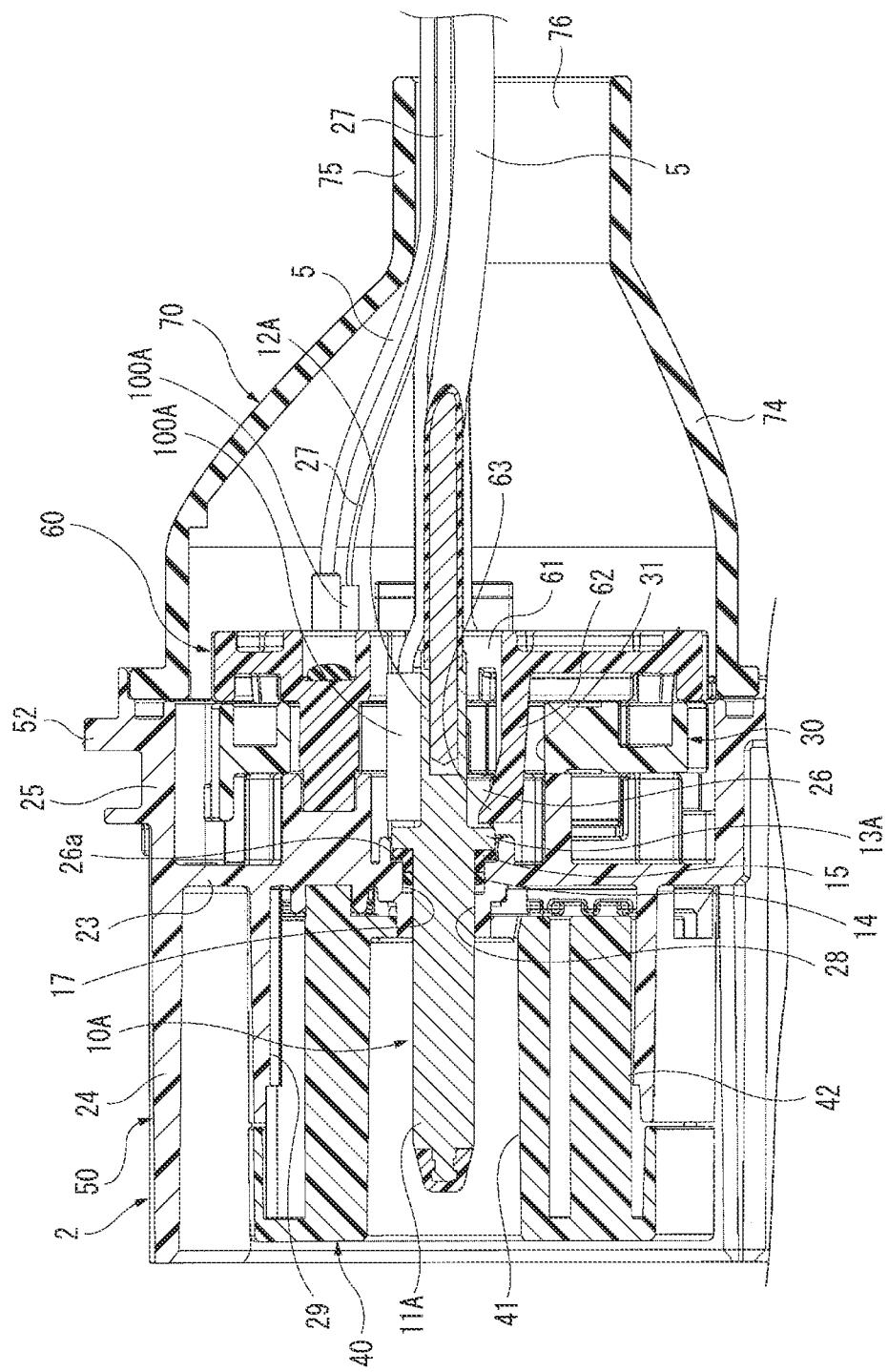
FIG. 3 is a cross-sectional view showing a first connector portion in the connector shown in FIG. 1.
Figure 4:
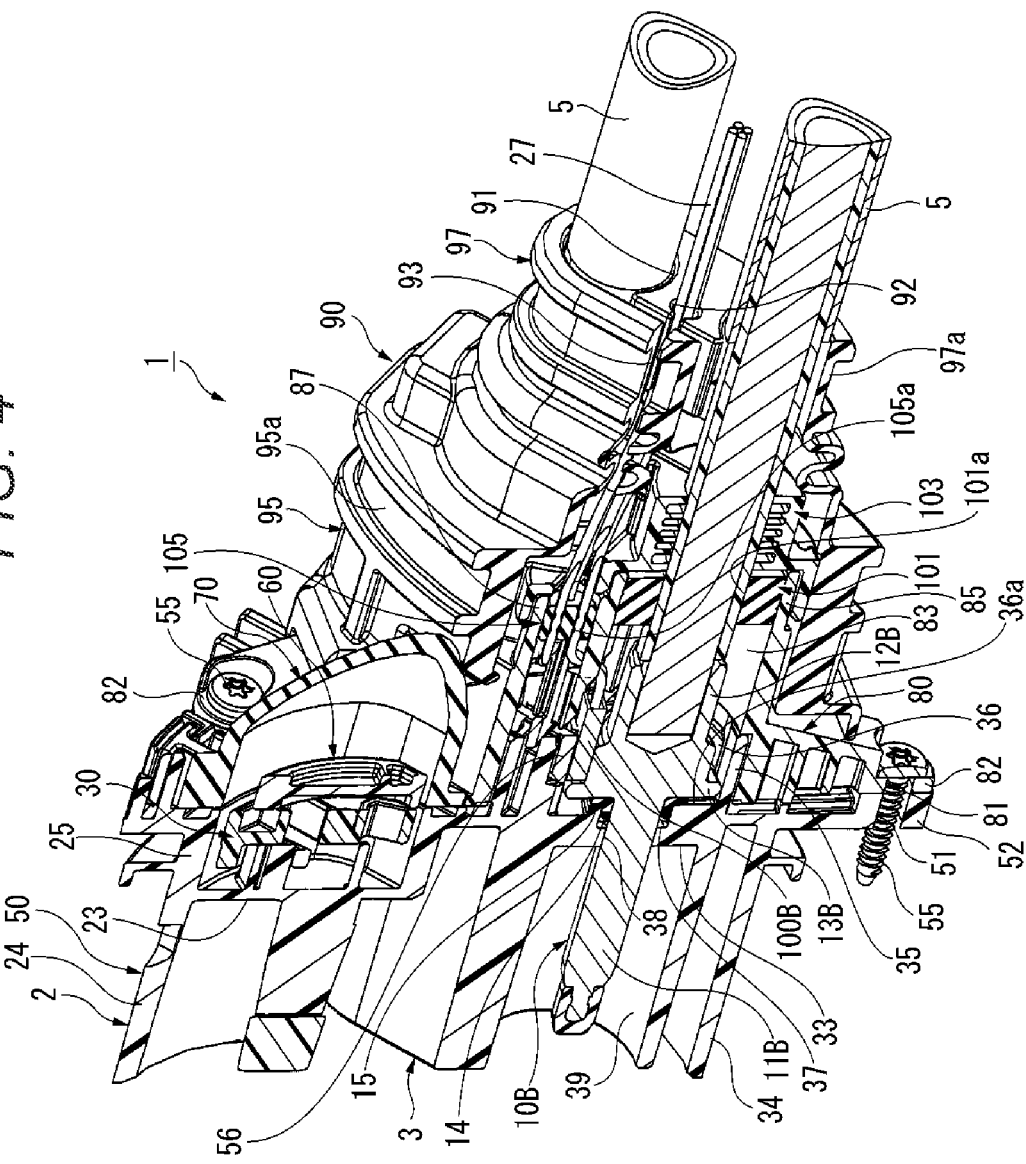
FIG. 4 is a cross-sectional perspective view showing a second connector portion in the connector shown in FIG. 1.

FIG. 3 is a cross-sectional view showing the first connector portion 2 in the connector 1 shown in FIG. 1. FIG. 4 is a cross-sectional perspective view showing the second connector portion 3 in the connector 1 shown in FIG. 1. As shown in FIGS. 3 and 4, the connector 1 according to the present embodiment mainly includes the terminals 10A, 10B, a front housing 50, a retainer 30, a front holder 40, a first rear housing 60, a first heat retaining cover 70, a second rear housing 80, a second heat retaining cover 90, and temperature sensors 10A, 100B.

The first connector portion 2 includes the terminals 10A, the front housing 50, the retainer 30, the front holder 40, the first rear housing 60, the first heat retaining cover 70, and the temperature sensors 100A. The second connector portion 3 includes the terminals 10B, the front housing 50, the second rear housing 80, the second heat retaining cover 90, and the temperature sensors 100B.

The terminals 10A, 10B that are terminal fittings according to the present embodiment are formed of a conductive metal material such as copper and a copper alloy, and are manufactured by cutting a round bar formed of the conductive metal material. Each of the terminals 10A, 10B is provided with an electrical connection portion 11A, 11B at a front end side of the terminals 10A, 10B, and an electric wire connection portion 12A, 12B at a rear end side of the terminals 10A, 10B. Each of the terminals 10A, 10B includes a flange portion 13A, 13B extending to an outer periphery (radially outward) and provided between the electrical connection portion 11A, 11B and the electric wire connection portion 12A, 12B. The terminals 10A, 10B are mounted to the front housing 50 of the connector 1 from a rear side of the connector 1 (from a rear side of an insertion direction of the terminals 10A, 10B in which the terminals 10A, 10B are inserted into the front housing 50).

The temperature sensors 100A, 100B according to the present embodiment are thermistors each having a thermistor element for detecting a temperature, and are formed into a substantially rectangular parallelepiped shape in which the thermistor element is covered with a resin. Detection lines 27 respectively connected to thermistor elements are drawn out from rear ends of the temperature sensors 100A, 100B. Each of the temperature sensors 100A is fixed to an outer surface of the electric wire connection portion 12A of the terminal 10A connected to an end portion of the electric wire 5 by a heat shrinkable tube or the like such that the temperature sensors 100A contact the outer surface of the electric wire connection portion 12A. Each of the temperature sensors 100B is fixed by means of, for example, a sensor holder 56 attached to the front housing 50, to an outer surface of a base portion of the electric wire connection portion 12B in the vicinity of (near/close to) the flange portion 13B of the terminal 10B, which is connected to an end portion of the electric wire 5, such that each of the temperature sensors 100B contacts the outer surface of the base portion of the electric wire connection portion 12B.

Now referring to FIG. 4, a housing according to the present embodiment includes the front housing 50, the first rear housing 60, and the second rear housing 80. Each of the front housing 50, the first rear housing 60, and the second rear housing 80 is formed of a synthetic resin.

The front housing 50 is formed into a substantially cylindrical shape and include the first connector portion 2 and the second connector portion 3 as partitioned portions. The front housing 50 includes partition walls 23 and 33 extending in an up-down direction (in a vertical direction of the front housing 50 or a direction perpendicular to the insertion direction of the terminals 10A, 10B) and provided in a rear side of the front housing 50 in an axial direction.

The partition walls 23 and 33 partition an inside of the front housing 50 in a front-rear manner, i.e., the partition walls 23 and 33 divide an inner space of the front housing 50 into two, a front space and a rear space. Of the front housing 50, a portion further in a front side than the partition wall 23 is a front peripheral wall 24 of the first connector portion 2, and a portion further in a front side than the partition wall 33 is a front peripheral wall 34 of the second connector portion 3. Of the front housing 50, a portion further at a rear side than the partition wall 23 is a rear peripheral wall 25 of the first connector portion 2, and a portion further in a rear side than the partition wall 33 is a rear peripheral wall 35 of the second connector portion 3. An attachment flange 52 having a bolt hole 51 protrudes toward an outer peripheral side of the front housing 50 (protrudes radially outward). A bolt 55 (see FIG. 4) inserted into the bolt hole 51 of the attachment flange 52 is to be screwed into a screw hole (not shown) of a vehicle, such that the connector 1 is attached to the vehicle.

As shown in FIG. 3, in a portion of the front housing 50 forming the first connector portion 2, the front holder 40 is attached inside the front peripheral wall 24, and the retainer 30 and the first rear housing 60 are attached in the rear peripheral wall 25. The first heat retaining cover 70 is mounted to a rear side of the rear peripheral wall 25.

A plurality of terminal accommodating chambers 26 are formed in the partition wall 23 of the front housing 50. The terminals 10A are inserted into the terminal accommodating chambers 26 from the rear side of the front housing 50. At a front side in the insertion direction in which the terminal 10A is inserted into the front housing 50, i.e., into the terminal accommodating chamber 26, the terminal accommodating chamber 26 is formed with a seal hole 17 having a smaller diameter than the terminal accommodating chamber 26, and is further formed with a through hole 28 having a smaller diameter than the seal hole 17. In the terminal 10A inserted into the terminal accommodating chamber 26, the electrical connection portion 11A is inserted into the through hole 28, and the flange portion 13A is locked by a bottom portion 26a of the terminal accommodating chamber 26 to restrict a forward movement of the terminal 10A in the insertion direction.

An annular seal member 15 and an O-ring 14 are mounted to the terminal 10A, which is to be inserted into the terminal accommodating chamber 26, at a base part of the electrical connection portion 11A connected to/in the vicinity of/near/close to the flange portion 13A. Accordingly, when the terminal 10A is inserted into the terminal accommodating chamber 26, the O-ring 14 is pushed into the seal hole 17 by the seal member 15, and the seal member 15 is interposed between the bottom portion 26a of the terminal accommodating chamber 26 and the flange portion 13A. Accordingly, a space between the terminal accommodating chamber 26 and the terminal 10A inserted into the terminal accommodating chamber 26 is sealed by the O-ring 14. The temperature sensor 100A is fixed to the electric wire connection portion 12A of the terminal 10A, and the detection line 27 drawn out from the temperature sensor 100A is routed along the electric wire 5.

The front housing 50 has a fitting recessed portion 29 inside the front peripheral wall 24. The fitting recessed portion 29 is formed further in the front side of the front housing 50 than the partition wall 23. The front holder 40 is formed of a synthetic resin and has a plurality of accommodating holes 41. A rear portion of the front holder 40 is a fitting portion 42. The fitting portion 42 is fitted into the fitting recessed portion 29 of the front housing 50, so that the front holder 40 is attached to the front housing 50 and disposed inside the front peripheral wall 24. When the front holder 40 is attached to the front housing 50, the accommodating hole 41 communicates with the through hole 28 of the partition wall 23 of the front housing 50. Accordingly, the electrical connection portion 11A of the terminal 10A that has passed through the through hole 28 is accommodated in the accommodating hole 41 of the front holder 40.

The first rear housing 60 is formed into a plate shape having a plurality of communicating holes 61. The communicating holes 61 communicate with the terminal accommodating chambers 26 of the front housing 50 when the first rear housing 60 is attached to the front housing 50. Further, the first rear housing 60 has a plurality of lances 62. These lances 62 are formed integrally with respective edges of the communicating holes 61, and extend in a direction in which the first rear housing 60 is attached to the front housing 50. A locking claw 63 protruding toward the center of the communicating hole 61 is formed at a tip end portion of each of the lances 62.

The retainer 30 is formed of a synthetic resin, and is formed into a plate shape. The retainer 30 is disposed between the front housing 50 and the first rear housing 60 when the first rear housing 60 is attached to the front housing 50. Accordingly, the retainer 30 is disposed inside the rear peripheral wall 25 of the front housing 50, and is slidably supported with respect to the front housing 50 and the first rear housing 60 in a direction perpendicular to the insertion direction in which the terminal 10A is inserted into the front housing 50. In other words, the retainer is configured to be displaceable/movable between a locking position and a non-locking position along the direction perpendicular to the insertion direction in which the terminal 10A is inserted into the front housing 50.

The retainer 30 has a plurality of openings 31. The openings 31 are configured to communicate with the terminal accommodating chambers 26 of the front housing 50 and the communicating holes 61 of the first rear housing 60. The lances 62 of the first rear housing 60 are configured to be inserted through the openings 31.

When the terminal 10A is attached to the front housing 50, in a state where the retainer 30 is in the non-locking position, the terminal 10A is inserted into the communicating hole 61 from a rear side of the first rear housing 60, and the electrical connection portion 11A is inserted into the through hole 28 of the front housing 50 and is accommodated in the terminal accommodating chamber 26. Then, the flange portion 13A of the terminal 10A is locked by the locking claw 63 of the lance 62, a rearward movement in the insertion direction of the terminal 10A is restricted, and the terminal 10A is prevented from coming off.

Next, when the retainer 30 disposed at the non-locking position slides to the locking position, each locking portion of the retainer 30 enters a space behind the flange portion 13A of the terminal 10A accommodated in the terminal accommodating chamber 26. Accordingly, the flange portion 13A of the terminal 10A is locked at two positions by the lance 62 of the first rear housing 60 and the locking portion of the retainer 30.

The first heat retaining cover 70 is mounted to the rear peripheral wall 25 of the front housing 50 so as to cover a rear end portion of the first rear housing 60. The first heat retaining cover 70 is formed of a synthetic resin, and is provided as a protector formed into a funnel shape. The first heat retaining cover 70 mainly includes an attachment flange 72, an enlarged diameter portion 73, a narrowed portion 74 and an electric wire guiding out portion 75. The attachment flange 72 has a bolt hole 71. The attachment flange 72 protrudes from the enlarged diameter portion 73 toward an outer peripheral side (protrude radially outward). The first heat retaining cover 70 is to be attached to a vehicle at the attachment flange 72 by the bolt 55, together with the attachment flange 52 of the front housing 50. The electric wire guiding out portion 75 is provided at a rear end of the narrowed portion 74 extending rearward from the enlarged diameter portion 73 of the first heat retaining cover 70. In other words, the narrowed portion 74 is disposed between the enlarged diameter portion 73 and the electric wire guiding out portion 75. The electric wire guiding out portion 75 is configured such that the electric wire 5 and the detection line 27 that are drawn out from the terminal accommodating chamber 26 are to be passed through the electric wire guiding out portion 75.

The first heat retaining cover 70 according to the present embodiment is mounted to cover the rear end portion of the first rear housing 60 having the communicating holes 61 communicating with the terminal accommodating chambers 26, so that heat inside of the terminal accommodating chambers 26 can be retained. In other words, the first heat retaining cover 70 is attached to the rear peripheral wall 25 of the front housing 50 such that the first heat retaining cover 70 covers/accommodate the rear end portion of the first rear housing 60. The electric wire guiding out portion 75 has an opening 76 configured such that the electric wire 5 and the detection line 27 are to be passed therethrough. The opening 76 has a minimum size or is covered with an adhesive tape (not shown) so as not to impair a heat retaining property (heat insulation property) in the first heat retaining cover 70.

As shown in FIG. 4, in a portion of the front housing 50 forming the second connector portion 3, an accommodating hole 39 is provided in the front peripheral wall 34, and the second rear housing 80 is attached to an outer side of the rear peripheral wall 35. The second heat retaining cover 90 is mounted to a rear side of the second rear housing 80.

A plurality of terminal accommodating chambers 36 are formed in the partition wall 33 of the front housing 50. The terminals 10B are inserted into the terminal accommodating chambers 36 from a rear side of the front housing 50. At a front side in the insertion direction in which the terminal 10B is inserted into the terminal accommodating chambers 36, each of the terminal accommodating chambers 36 is formed with a seal hole 37 having a smaller diameter than the terminal accommodating chamber 36, and is further formed with a through hole 38 having a smaller diameter than the seal hole 37. Of the terminal 10B inserted into the terminal accommodating chamber 36, the electrical connection portion 11B is inserted into the through hole 38, and the flange portion 13B is locked by a bottom portion 36a of the terminal accommodating chamber 36 to restrict a forward movement of the terminal 10B.

The annular seal member 15 and the O-ring 14 are mounted to the terminal 10B, which is inserted into the terminal accommodating chamber 36, at a base portion of the electrical connection portion 11B connected/in the vicinity of/near/close to the flange portion 13B. Accordingly, when the terminal 10B is inserted into the terminal accommodating chamber 36, the O-ring 14 is pushed into the seal hole 37 by the seal member 15, and the seal member 15 is interposed between the bottom portion 36a of the terminal accommodating chamber 36 and the flange portion 13B. Accordingly, a space between the terminal accommodating chamber 36 and the terminal 10B inserted into the terminal accommodating chamber 36 is sealed by the O-ring 14.

The front housing 50 has the accommodating hole 39 inside the front peripheral wall 24. The accommodating hole 39 is formed further in the front side of the front housing 50 than the partition wall 33 and communicates with the through hole 38 of the partition wall 33. Accordingly, the electrical connection portion 11B of the terminal 10B that has passed through the through hole 38 is accommodated in the accommodating hole 39.

The second rear housing 80 is formed into a cylindrical shape having a plurality of communicating holes 83. The communicating holes 83 communicate with the terminal accommodating chambers 36 of the front housing 50 when the second rear housing 80 is attached to the front housing 50. The second rear housing 80 includes an electric wire seal accommodating portion 85 and a detection line seal accommodating portion 87 at a rear end of the communicating hole 83. An electric wire seal member 101 is mounted to the electric wire seal accommodating portion 85 and is prevented from coming off by a seal holder 103. The electric wire seal member 101 is provided with an electric wire seal hole 101a through which the electric wire 5 is inserted.

Accordingly, the electric wire 5 inserted into the communicating hole 83 of the second rear housing 80 is sealed by the electric wire seal member 101 between the electric wire 5 and the electric wire seal accommodating portion 85 (i.e., the space inside the electric wire seal accommodating portion 85 between an outer surface of the electric wire 5 and a surface defining the electric wire seal accommodating portion 85 is sealed by the electric wire seal member 101). A detection line seal member 105 is mounted to the detection line seal accommodating portion 87 provided above the electric wire seal accommodating portion 85. The detection line seal member 105 is provided with a detection line seal hole 105a through which the detection line 27 is inserted. Accordingly, the detection line 27 drawn out from the communicating hole 83 of the second rear housing 80 is sealed by the detection line seal member 105 between the detection line 27 and the detection line seal accommodating portion 87 (i.e., the space between an outer surface of the detection line 27 and a surface defining the detection line seal accommodating portion 87 is sealed by the detection line seal member 105).

Further, the second rear housing 80 has a plurality of lances (not shown). These lances are formed integrally with respective edges of the communicating holes 83, and extend in a direction in which the second rear housing 80 is attached to the front housing 50. A locking claw protruding toward the center of the communicating hole 83 is formed at a tip end portion of each of the lances. Therefore, when the electric wire connection portion 12B of the terminal 10B connected to an end portion of the electric wire 5 is inserted into the communicating hole 83 from a front side of the second rear housing 80, the flange portion 13B is locked by locking claws of the lances, so that the terminal 10B is held by the second rear housing 80 and is prevented from coming off from the second rear housing 80.

When the terminal 10B is attached to the front housing 50, the electrical connection portion 11B of the terminal 10B held by the second rear housing 80 is inserted through the through hole 38 from a rear side of the partition wall 33, and is accommodated in the terminal accommodating chamber 36. An attachment flange 82 having a bolt hole 81 protrudes toward an outer peripheral side of the second rear housing 80 (protrude radially outward), and is attached to a vehicle by the bolt 55 together with the attachment flange 52 of the front housing 50.

Next, the second heat retaining cover 90 is mounted to a rear end portion of the second rear housing 80 so as to cover the communicating holes 83. The second heat retaining cover 90 is formed of an elastic material such as rubber, and is a so-called grommet formed into a substantially cylindrical shape. The second heat retaining cover 90 includes a slit 93 configured to facilitate an insertion work of the electric wire 5 and the detection line 27. The slit 93 runs along an axial direction of the second heat retaining cover 90.

The second heat retaining cover 90 includes an enlarged diameter portion 95 and an electric wire guiding out portion 97. The enlarged diameter portion 95 of the second heat retaining cover 90 is fitted onto the rear end portion of the second rear housing 80, and is fixed by, for example, a tightening belt wound around a groove 95a on an outer peripheral surface. The electric wire guiding out portion 97 is provided at a rear end of the second heat retaining cover 90 extending rearward from the enlarged diameter portion 95. The electric wire 5 and the detection line 27 that are drawn out from the terminal accommodating chamber 36 are to be inserted through the electric wire guiding out portion 97.

The electric wire guiding out portion 97 of the second heat retaining cover 90 is formed with an electric wire through hole 91 through which the electric wire 5 is inserted and a detection line through hole 92 through which the detection line 27 is inserted. After the electric wire 5 and the detection line 27 are inserted, the electric wire guiding out portion 97 is fixed to the electric wire 5 by, for example, a tightening belt wound around a groove 97a on outer peripheral surface.

The second heat retaining cover 90 according to the present embodiment is mounted to the rear end portion of the second rear housing 80 to cover the rear end portion of the second rear housing 80 including the communicating hole 83 communicating with the terminal accommodating chamber 36, so that heat inside of the terminal accommodating chamber 36 can be retained. The slit 93 of the second heat retaining cover 90 is covered with an adhesive tape (not shown) so as not to impair a heat insulation property in the second heat retaining cover 90.

Next, functions of the connector 1 having the above-described configuration will be described. In the connector 1 according to the present embodiment, heat inside of the terminal accommodating chamber 26 of the first connector portion 2 is retained by the first heat retaining cover 70, and heat inside of the terminal accommodating chamber 36 of the second connector portion 3 is retained by the second heat retaining cover 90. Therefore, heat transfer from a heat generation portion (for example, a portion in contact with a counterpart terminal fitting) of the terminals 10A, 10B is improved, so that a temperature of the entire terminal 10A and a temperature of the entire terminal 10B are made uniform. In other words, heat emitted from the heat generation portion of each of the terminals 10A, 10B can be retained inside the first heat retaining cover 70 and the second heat retaining cover 90 and therefore the heat can be efficiently transmitted to other parts of the terminals 10A, 10B than the heat generation portion so that temperature of an entirety of each of the terminals 10A, 10B become uniform.

Figure 5A:
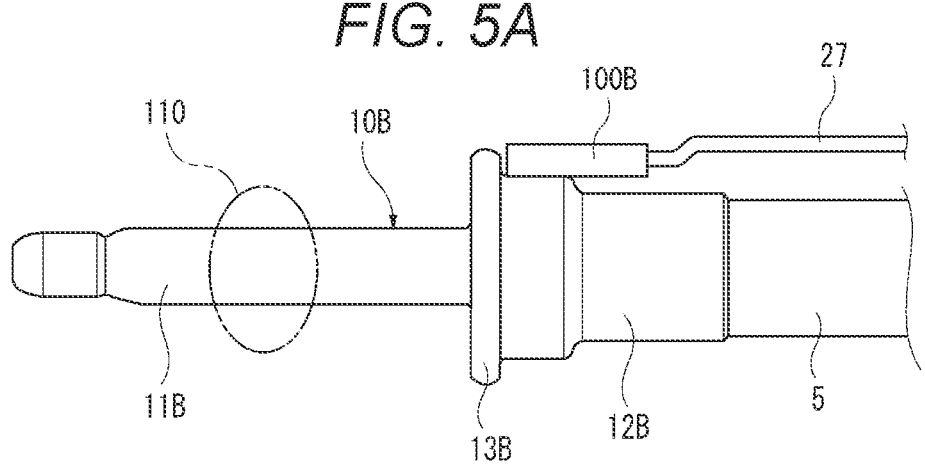
Figure 5B:
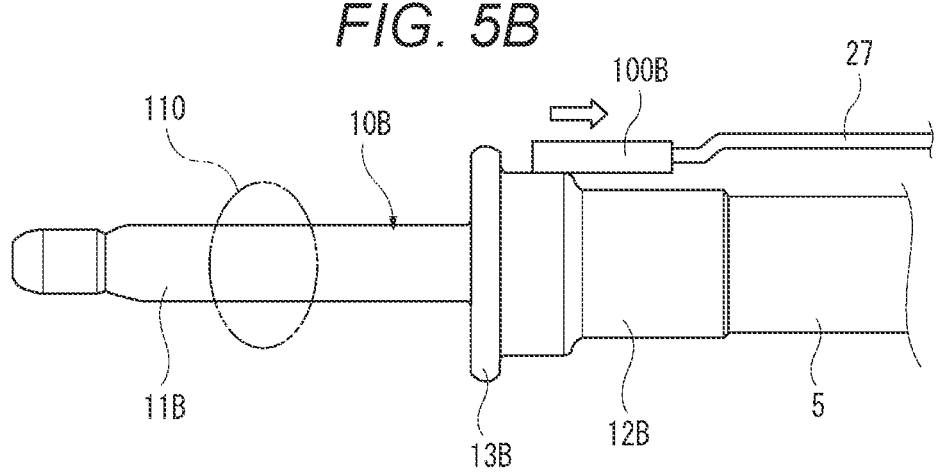

FIGS. 5A and 5B are schematic views showing an attachment state of the temperature sensor 100B attached to the terminal 10B. FIG. 5A shows the temperature sensor 100B at a predetermined position and FIG. 5B shows the temperature sensor 100B which is displaced from the predetermined position. As shown in FIG. 5A, the temperature sensor 100B is fixed on an outer surface of a root of the electric wire connection portion 12B in the vicinity of (near/close to/connected to) the flange portion 13B of the terminal 10B such that the temperature sensor 100B contacts the outer surface of the root of the electric wire connection portion 12B.

As shown in FIG. 5B, the temperature sensor 100B attached to the terminal 10B may be displaced due to a clearance between components, shrinkage caused by a temperature change, and the like, resulting in the temperature sensor 100B being away from a heat generating portion 110. However, since heat transfer from the heat generating portion 110 is improved in the terminal 10B whose heat is retained by the second heat insulating cover 90, a temperature of the entire terminal 10B is made uniform and temperature detection sensitivity of the temperature sensor 100B is not reduced. As a result, the temperature sensor 100B in the connector 1 according to the present embodiment can appropriately detect abnormal heat generation. The same applies to the temperature sensor 100A fixed on an outer surface of the electric wire connection portion 12A of the terminal 10A such that the temperature sensor 100A contacts the outer surface of the electric wire connection portion 12A.

Heat inside of the terminal accommodating chamber 26 and inside of the terminal accommodating chamber 36 is retained by the first heat retaining cover 70 and the second heat retaining cover 90, and heat transfer to the entire terminal 10A and the entire terminal 10B is improved, so that heat can be transferred to the entire terminal 10A, 10B, or the entire housing including the front housing 50, the first rear housing 60, and the second rear housing 80. Therefore, a temperature rise of the terminal 10A, 10B and an increase in electric resistance accompanying with the temperature rise can be prevented, and energization performance can be improved.

Further, the second connector portion 3 of the connector 1 according to the present embodiment includes the electric wire seal accommodating portion 85 and the detection line seal accommodating portion 87 that are connected to the terminal accommodating chamber 36, the electric wire seal member 101 that is provided with the electric wire seal hole 101a through which the electric wire 5 is inserted and that is mounted to the electric wire seal accommodating portion 85, and the detection line seal member 105 that is provided with the detection line seal hole 105a through which the detection line 27 is inserted and that is mounted to the detection line seal accommodating portion 87.

Therefore, according to the connector 1 in the present embodiment, the terminal 10B and the temperature sensor 100B that are accommodated in the terminal accommodating chamber 36 of the second connector portion 3 can be stably waterproof. Further, since the terminal accommodating chamber 36 is sealed by the electric wire seal member 101 and the detection line seal member 105, a heat insulation effect in the terminal accommodating chamber 36 that is achieved by the second heat retaining cover 90 can be further improved, and heat transfer to the entire terminal 10B can be further improved.

As described above, according to the connector 1 in the present embodiment, a temperature of the terminal 10A, 10B can be accurately measured without reducing the temperature detection sensitivity of the temperature sensor 100A, 100B.

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims. For example, the heat retaining cover according to the present invention for heat insulating the inside of the terminal accommodating chamber is not limited to the first heat retaining cover 70 and the second heat retaining cover 90 in the embodiment described above, and can adopt forms of various wire harness exterior materials such as a corrugated tube and a twist tube based on the gist of the present invention.

According to an aspect of the embodiments described above, a connector (1) includes a terminal fitting (terminal 10A, 10B) connected to an end of an electric wire (5), a housing (front housing 50) including a terminal accommo- dating chamber (26, 36) configured to accommodate the terminal fitting (terminal 10A, 10B), a temperature sensor (100A, 100B) connected to an end of a detection line (27) and configured to be attached to the terminal fitting (terminal 10A, 10B), and a heat retaining cover (the first heat retaining cover 70, the second heat retaining cover 90). The heat retaining cover (the first heat retaining cover 70, the second heat retaining cover 90) is configured to: be attached to the housing (front housing 50) such that the heat retaining cover (the first heat retaining cover 70, the second heat retaining cover 90) covers a rear end portion of the housing (front housing 50); and to retain heat inside the terminal accom- modating chamber (26, 36), the heat retaining cover (the first heat retaining cover 70, the second heat retaining cover 90) having an electric wire guiding out portion (75, 97) through which the electric wire (5) and the detection line (27) drawn out from the terminal accommodating chamber (26, 36) are to be inserted.

According to the connector having the above described configuration, heat inside of the terminal accommodating chamber is retained by the heat retaining cover and heat transfer from a heat generating portion (for example, a portion in contact with a counterpart terminal fitting) of the terminal fitting is improved, so that a temperature of the entire terminal fitting is made uniform or homogenized. Therefore, even when the temperature sensor attached to the terminal fitting is displaced due to a clearance between components, shrinkage caused by a temperature change, and the like, temperature detection sensitivity of the temperature sensor is not reduced. As a result, the temperature sensor in the connector having the configuration can appropriately detect abnormal heat generation. Heat inside of the terminal accommodating chamber is retained by the heat retaining cover and heat transfer to the entire terminal fitting is improved, so that heat can be transferred to the entire terminal fitting or the entire housing. Therefore, a tempera- ture rise of the terminal fitting and an increase in electric resistance accompanying with the temperature rise can be prevented, and energization performance can be improved.

The connector (1) may further include an electric wire seal accommodating portion (85) and a detection line seal accommodating portion (87) continuously provided with the terminal accommodating chamber (36), respectively, an electric wire seal member (101) including an electric wire seal hole (101a) through which the electric wire (5) is to be inserted and configured to be attached to the electric wire seal accommodating portion (85), and a detection line seal member (105) including a detection line seal hole (105a) through which the detection line (27) is to be inserted and configured to be attached to the detection line seal accom- modating portion (87).

According to the connector having the above described configuration, the terminal fitting and the temperature sensor that are accommodated in the terminal accommodating chamber can be stably waterproof. Further, since the termi- nal accommodating chamber is sealed by the electric wire seal member and the detection line seal member, a heat insulation effect in the terminal accommodating chamber that is achieved by the second heat retaining cover can be further improved, and heat transfer to the entire terminal fitting can be further increased.

The heat retaining cover (the first heat retaining cover 70, the second heat retaining cover 90) may be configured to homogenize temperature of an entirety of the terminal fitting (terminal 10A, 10B).

What is claimed is:

1. A connector comprising:

a terminal fitting connected to an end of an electric wire;

a housing including a terminal accommodating chamber configured to accommodate the terminal fitting;

a temperature sensor connected to an end of a detection line and configured to be attached to the terminal fitting; and a first heat retaining cover and a second heat retaining cover, wherein the first and second heat retaining covers are attached to portions of the housing such that the first and second heat retaining covers cover respective rear end portions of the housing, the first and second heat retaining covers are configured to retain heat inside the terminal accommodating chambers, and the first heat retaining cover having an electric wire guiding out portion through which the electric wire and the detection line drawn out from the terminal accommodating chamber are to be inserted.

2. The connector according to claim 1, wherein the first and second heat retaining covers are configured to homogenize temperature of an entirety of the terminal fitting.

3. A connector comprising:

a terminal fitting connected to an end of an electric wire;

a housing including a terminal accommodating chamber configured to accommodate the terminal fitting;

a temperature sensor connected to an end of a detection line and configured to be attached to the terminal fitting; and a heat retaining cover, wherein the heat retaining cover is configured to: be attached to the housing such that the heat retaining cover covers a rear end portion of the housing; and to retain heat inside the terminal accommodating chamber, the heat retaining cover having an electric wire guiding out portion through which the electric wire and the detection line drawn out from the terminal accommodating chamber are to be inserted;

an electric wire seal accommodating portion and a detection line seal accommodating portion continuously provided with the terminal accommodating chamber, respectively, an electric wire seal member including an electric wire seal hole through which the electric wire is to be inserted and configured to be attached to the electric wire seal accommodating portion, and a detection line seal member including a detection line seal hole through which the detection line is to be inserted and configured to be attached to the detection line seal accommodating portion.

* * * * *